(12) United States Patent
Buchecker et al.

(10) Patent No.: US 7,514,514 B2
(45) Date of Patent: Apr. 7, 2009

(54) PHOTOACTIVE COPOLYMER

(75) Inventors: Richard Buchecker, Zurich (CH); Guy Marck, Schlierbach (FR); Olivier Muller, Lautenbach (FR); Hubert Seiberle, Weil am Rhein (DE); Andreas Schuster, Freiburg (DE)

(73) Assignee: Rolic AG, Zug (CH)

( * ) Notice: Subject to any disclaimer, the term of this patent is extended or adjusted under 35 U.S.C. 154(b) by 260 days.

(21) Appl. No.: 10/451,995

(22) PCT Filed: Dec. 28, 2001

(86) PCT No.: PCT/CH01/00742

§ 371 (c)(1), (2), (4) Date: Dec. 1, 2003

(87) PCT Pub. No.: WO02/053609

PCT Pub. Date: Jul. 11, 2002

(65) Prior Publication Data
US 2004/0138394 A1   Jul. 15, 2004

(30) Foreign Application Priority Data
Dec. 29, 2000   (EP) ................... 00811258

(51) Int. Cl.
*C08F 120/54* (2006.01)
(52) U.S. Cl. .................... 526/303.1; 526/319
(58) Field of Classification Search ........... 526/303.1, 526/319
See application file for complete search history.

(56) References Cited

U.S. PATENT DOCUMENTS

| | | |
|---|---|---|
| 4,631,328 A | 12/1986 | Ringsdorf et al. |
| 5,539,074 A | 7/1996 | Herr et al. |
| 5,602,661 A | 2/1997 | Schadt et al. |
| RE36,625 E | 3/2000 | Herr et al. |
| 6,107,427 A | 8/2000 | Herr et al. |
| 6,160,597 A | 12/2000 | Schadt et al. |
| 6,201,087 B1 * | 3/2001 | Herr et al. ............ 526/268 |
| 6,335,409 B1 | 1/2002 | Herr et al. |
| 2001/0030727 A1 | 10/2001 | Schadt et al. |

FOREIGN PATENT DOCUMENTS

| | | |
|---|---|---|
| EP | 0 090 282 | 10/1983 |
| EP | 0 611 786 | 8/1994 |
| EP | 0 763 552 | 3/1997 |
| WO | WO 96/10049 | 4/1996 |

* cited by examiner

*Primary Examiner*—Robert D. Harlan
(74) *Attorney, Agent, or Firm*—Sughrue Mion, PLLC

(57) ABSTRACT

A novel photoactive copolymer and its use as orientation layers for liquid crystals and in the construction of unstructured and structured optical elements and multilayer systems. The copolymer contains side chains incorporating photoreactive groups and simultaneously side chains of general formula (I)

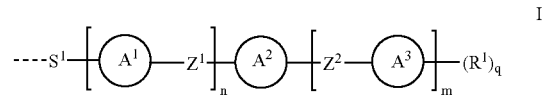

wherein the total number of rings, including the number of rings in optionally present condensed systems is at least two and at most six; wherein the broken line symbolizes the point of linkage to the polymer main chain; and wherein the variables are defined in the disclosure.

51 Claims, No Drawings

PHOTOACTIVE COPOLYMER

This application is a national stage filing under 35 U.S.C. §371 of international application No. PCT/Ch01/00742, filed on Dec. 28, 2001. This application claims the benenfit of priority under 35 U.S.C. § 119(a) to European patent application No. 00 811 258.3, filed on Dec. 29, 2000.

The present invention relates to a new photoactive copolymer and its use—alone or admixed with at least with one other photoactive polymer—as orientation layers for liquid crystals and in the construction of unstructured and structured optical elements and multi-layer systems.

The successful functioning of a liquid crystal device relies upon the ability of the liquid crystal molecules within that device to adopt and maintain an alignment imposed upon them. Alignment of the liquid crystal molecules is achieved by use of an orientation layer which defines a direction of orientation for the liquid crystal molecules of the device with the result that the longitudinal axes of the molecules become aligned with the direction of orientation defined by the orientation layer. In addition to this directional alignment, the orientation layer is also able to impart to the liquid crystal molecules an angle of tilt so that the molecules align themselves at an angle to the surface of the orientation layer rather than lying parallel hereto.

Tilt angles of between 1° and 15° are usual for nematic liquid crystal displays (LCDs). Some electro-optical effects used for LCDS, however, require alignment layers with very high pretilt angles. Vertically aligned nematic (VAN) LDs for instance require pretilt angles between 85° and 90°, measured from the surface plane. In the case of hybrid aligned nematic (HAN) LCDs, the pretilt angle at one of the substrates has to be in the above range, whereas the tilt angle at the other substrate is low (typically 0° to 10°).

Methods of preparing structured and unstructured orientation layers are well known to a skilled person. Customarily used uniaxially rubbed polymer orientation layers such as, for example, polyimides however impact a series of disadvantages like dust generation during rubbing process, destruction of thin film transistors and lack of structuring. The rubbing process consequently does not allow the production of structured layers. Orientation layers in which the direction of orientation can be predetermined by irradiation with polarized light have been known for some time. It is by that means possible to avoid the problems inherent in the rubbing process. In addition, it is possible to provide areas having different orientation and thus to structure the orientation layer as described for example in Jpn. J. Appl. Phys., Vol. 31 (1992), 2155-64 (Schadt et al.). In that process the dimerisation of polymer-bonded photoreactive cinnamic acid groups induced by irradiation with linearly polarized light is employed leading to an anisotropic polymer network. Those photo-oriented polymer networks can be used wherever structured or unstructured liquid crystal orientation layers are required.

EP-A-0611786 and WO-A-96/10049 (both F. Hoffmann-La Roche AG), as well as EP-A-0763552 (Rolic AG), describe cinnamic acid polymers that are suitable in principle for the synthesis of such anisotropically cross-linked, photo-structured orientation layers for liquid crystals. In the case of the compounds described in EP-A-0763552 and WO-A-96/10049, on irradiation with linearly polarized light it is possible, in addition to inducing the desired orientation, simultaneously to induce an angle of tilt. It is thus possible to produce layers having structuring in respect of surface orientation and angle of tilt.

The above photostructured orientation layers have the disadvantage, however, that for certain applications, especially for use in TFT displays, they result in adjacent liquid crystal mixture having an insufficient electrical resistance value. In TFT displays, too low a resistance value of the liquid crystal medium leads to an inadequate "holding ratio", which is a measure of the voltage drop in the display after the voltage has been switched off. Low holding ratio values, however, bring about undesirable changes in brightness and contrast over time and thus result in unstable graduations of the grey tones.

Recently, photoreactive materials for orientation layers with improved holding ratios were described in WO-A-99/49360 (Rolic AG), JP-A-10-195296, JP-A-10-232400 (both Samsung Electron Devices Co., Ltd.), WO-A-99/15576 (Rolic AG) and WO-A-99/51662 (Kanegafuchi Kagaku Kogyo KK). In WO-A-99/49360, JP-A-10-195296 and JP-A-10-232400, blends of polymeric compounds containing photoreactive polymers on the one hand and polyimides on the other hand are proposed. A disadvantage of such blends is their limited miscibility. Low contents of photoreactive polymers however lead to a loss of orienting properties and consequently to a reduced contrast ratio of liquid crystal layers to be oriented whereas a reduced polyimide content results in insufficient holding ratios. In WO-A-99/15576 and WO-A-99/51662 polyimides incorporating photoreactive cinnamate groups in their side chains are described.

A usually important feature necessary for orientation layers used in LCDs is the photostability of tilt angles. Especially in displays using high light intensities, for instance in projection displays, for the known photo orientation materials often changes in the predetermined tilt angles are observed with time. Such changes in tilt angle however lead to a continuous loss of picture contrast upon light exposition. There is consequently a need for photoalignment materials having good aligning properties and simultaneously the ability to induce angles of tilt of variable size, which show an improved stability over a long period of time. In addition high voltage holding ratios should be feasible whenever required.

Surprisingly it has now been found that the photoactive copolymer according to claim 1 fulfills at least partly these requirements.

A first aspect of the present invention therefore provides a photoactive copolymer which contains side chains incorporating photoreactive groups and simultaneously side chains of the general formula I:

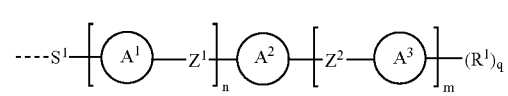

wherein
the total number of rings (including the number of rings in optionally present condensed systems) is at least two and at most six; and wherein
the broken line symbolizes the linkage to the polymer main chain;
$A^2$ represents an alicyclic ring or a condensed ring system incorporating 2-5 rings, in which one or more non adjacent $CH_2$ groups are optionally replaced by oxygen, which is unsubstituted or substituted by fluorine or by a straight-chain or branched alkyl residue which is unsubstituted, mono-substituted by cyano or halogeno, or poly-substituted by halogeno, having 1 to 18 carbon atoms and wherein one or more non adjacent $CH_2$ groups may independently be replaced by a group Q, where Q represents —O—, —CO—, —CO—O—, —O—CO—, —Si(CH$_3$)$_2$ —O—Si(CH$_3$)$_2$—, NR$^2$—, —NR$^2$—CO—, —CO—NR$^2$—, —NR$^2$—CO-O—, —O—CO—NR$^2$—, —NR$^2$—CO—NR$^2$—, —CH=CH—, —C≡C—, —O—CO—O—, and R$^2$ represents hydrogen or lower alkyl;

A$^1$, A$^3$ each independently of the other represents an aromatic or alicyclic group which is unsubstituted or substituted by fluorine, chlorine, cyano or by a cyclic, straight-chain or branched alkyl residue which is unsubstituted, mono-substituted by cyano or halogeno, or poly-substituted by halogeno, having 1 to 18 carbon atoms and wherein one or more non adjacent CH$_2$ groups may independently be replaced by Q, wherein Q and R$^2$ have the meaning given above, with the proviso that —CH=CH—, —C≡C— are not in conjugation with aromatic rings;

S$^1$ represent a single covalent bond or a spacer unit, such as a straight-chain or branched alkylene residue which is unsubstituted, mono-substituted by cyano or halogeno, or poly-substituted by halogeno, having 1 to 24 carbon atoms, wherein one or more non adjacent CH$_2$ groups may independently be replaced by Q, wherein Q and R$^2$ have the meaning given above;

Z$^1$, Z$^2$ represent a single covalent bond or a spacer unit, such as a straight-chain or branched alkylene residue which is unsubstituted, mono-substituted by cyano or halogeno, or poly-substituted by halogeno, having 1 to 8 carbon atoms, wherein one or more non adjacent CH$_2$ groups may independently be replaced by Q, wherein Q and R$^2$ have the meaning given above;

R$^1$ is a hydrogen atom, a halogen atom, a cyano group or a straight-chain or branched alkyl residue which is unsubstituted, mono-substituted by cyano or halogeno, or poly-substituted by halogeno, having 1 to 18 carbon atoms, wherein one or more non adjacent CH$_2$ groups may independently be replaced by Q, wherein Q and R$^2$ have the meaning given above with the proviso that the groups —CH=CH—, —C≡C— are not attached directly to an aromatic ring;

n and m each independently are 0, 1 or 2 such that (m+n)<2 and q denotes 0 or 1.

By the term "alicyclic" it should be understood to include non-aromatic carbocyclic or heterocyclic ring systems with 3 to 10 carbon atoms like cyclopropane, cyclobutane, cyclopentane, cyclopentene, cyclohexane, cyclohexene, and cyclohexadiene.

By the term "aromatic" it should be understood to include optionally substituted carbocyclic and heterocyclic groups incorporating five, six or ten ring atoms like furan, phenyl, pyridine, pyrimidine, naphthalene, or tetraline units.

By the term "lower alkyl" it should be understood to include straight chain and branched hydrocarbon radicals having from 1 to 6 carbon atoms, preferably from 1 to 3 carbon atoms. Methyl, ethyl, propyl and isopropyl groups are especially preferred.

In further aspects, the invention also provides the use of the polymers of the general formula I for the production of photoreactive mixtures, and the use alone or in mixtures as orientation layers for liquid crystals. Such orientation layers may be unstructured or structured (patterned, multi-domain) and may advantageously be used in the construction of LCDs as well as in the construction of unstructured and structured optical elements and multi-layer systems such as non-absorptive color filters, linear and circular polarizers, optical delay layers etc., which are for example exemplified in EP-A-0611981, EP-A-0689084, EP-A-0753785 (all F. Hoffmann-La Roche AG) and WO-A-98/52077 (Rolic AG).

The new photoactive material shows excellent alignment and generally induce very high pretilt angles. In mixtures with other photoreactive polymers, it can be used to achieve defined pretilt angles in the whole range of 1° to 90°. Surprisingly, such adjusted pretilt angles are stable upon illumination with strong visible light during a very long period of time.

Preferred rings A$^2$ are unsubstituted five membered or six membered rings or an optionally substituted group of 2 to 5 condensed rings, in which one or two non adjacent CH$_2$ groups are optionally replaced by oxygen.

More preferred rings A$^2$ are cyclopentane-1,3-diyl, cyclohexane-1,4-diyl, decalin-2,6-diyl, perhydrophenanthren-2,7-diyl, perhydroanthracen-2,6-diyl or a group incorporating a condensed ring system selected from a radical of a naturally occurring, at least bicyclic, diterpene or triterpene or from a steroid, most preferably cholesterol or cholestanol.

Most preferred rings A$^2$ are trans-decalin-2,6-diyl, trans, trans-perhydrophenanthren-2,7-diyl or a group incorporating a condensed ring system selected from a radical of a naturally occurring, at least bicyclic, diterpene or triterpene or from a steroid, most preferably cholesterol or cholestanol.

Preferred rings A$^1$ and A$^3$ independently of each other are unsubstituted saturated five or six membered alicyclic rings or six membered aromatic rings optionally substituted by fluorine or chlorine or by a straight chain or branched alkyl residue which is unsubstituted, mono- or poly-substituted by fluorine having 1-12 carbon atoms wherein one or more non adjacent CH$_2$ groups may independently be replaced by —O—, —CO—O—, —O—CO—, —NR$^2$—CO—, —CO—NR$^2$—, —NR$^2$—CO—O—, —O—CO—NR$^2$—, —CH=CH—, —C≡C—, —O—CO—O—, with the proviso that —CH=CH—, —C≡C— are not in conjugation with an aromatic ring and wherein R$^2$ represents a hydrogen atom or lower alkyl.

More preferred rings A$^1$ and A$^3$ are unsubstituted cyclopentane-1,3-diyl, cyclohexane-1,4-diyl or 1,4-phenylene which is unsubstituted, mono- or poly-substituted by fluorine or chlorine or a straight-chain or branched alkyl residue which is unsubstituted, mono- or poly-substituted by fluorine having 1-12 carbon atoms wherein one or more non adjacent CH$_2$ groups may independently be replaced by —O—, —CO—O—, —O—CO—, —CH=CH—, —C≡C—, with the proviso that CH=CH— and —C≡C— are not in conjugation with aromatic rings.

Preferred "spacer units" S$^1$ in the context of the present invention are a single bond, —CH$_2$— or a straight-chain or branched alkylene grouping, represented by —(CH$_2$)$_r$—, and also —(CH$_2$)$_r$—O—, —(CH$_2$)$_r$—CO—, —(CH$_2$)$_r$—CO—O—, —(CH$_2$)$_r$—O—CO—, —(CH$_2$)$_r$—CO—NR$^2$—, —(CH$_2$)$_r$NR$^2$—CO—, —(CH$_2$)$_r$—NR$^2$—, —(CH$_2$)$_r$—O—(CH$_2$)$_s$—, —(CH$_2$)$_r$—CO—O—(CH$_2$)$_s$—, —(CH$_2$)$_r$—O—CO—(CH$_2$)$_s$—, —(CH$_2$)$_r$—NR$^2$—CO—(CH$_2$)$_s$—, —(CH$_2$)$_r$—NR$^2$—CO—O—(CH$_2$)$_s$—, —(CH$_2$)$_r$—O—(CH$_2$)$_s$—O—, —(CH$_2$)$_r$—CO—O—(CH$_2$)$_s$—O—, —(CH2)r—O—CO—(CH$_2$)$_s$—O—, —(CH$_2$)$_r$—NR$^2$—CO—(CH$_2$)$_s$—O—, —(CH$_2$)$_r$—NR$^2$—CO—O—(CH$_2$)$_s$—O—, and if attached to a polystyrene, polyimide, polyamic acid or polyamic acid ester backbone also —O—(CH$_2$)$_r$—, —CO—O—(CH$_2$)$_r$—, —O—CO—(CH$_2$)$_r$—, —NR$^2$—CO—(CH$_2$)$_r$—, —CO—NR$^2$—(CH$_2$)$_r$—, —NR$^2$(CH$_2$)$_r$—, —O—(CH$_2$)$_r$—CO—O—, —O—(CH$_2$)$_r$—O—CO—, —O—(CH$_2$)$_r$—CO—NR$^2$—, —O—(CH$_2$)$_r$—NR$^2$—, —O—(CH$_2$)$_r$—O—, —O—(CH$_2$)$_r$—NR$^2$—CO—, —NR$^2$—(CH$_2$)$_r$—CO—O—, —NR$^2$—(CH$_2$)$_r$—O—, —NR$^2$—(CH$_2$)$_r$—NR$^2$—, —NR$^2$—(CH$_2$)$_r$—O—CO—, —CO—NR$^2$—(CH$_2$)$_r$—O—, —CO—NR$^2$—(CH$_2$)$_r$—NR$^2$—, —CO—NR$^2$—(CH$_2$)$_r$O—CO—, —O—CO—

—(CH$_2$)$_r$—CO—, —O—CO—(CH$_2$)$_r$—O—, —O—CO—(CH$_2$)$_r$—NR$^2$—, —O—CO—(CH$_2$)$_r$—CO—O—, —O—CO—(CH$_2$)$_r$—CO—NR$^2$—, —O—CO—(CH$_2$)$_r$—NR$^2$—CO—, —O—(CH$_2$)$_r$—O—(CH$_2$)$_s$—, —O—(CH$_2$)$_r$—CO—O—(CH$_2$)$_s$—, —O—(CH$_2$)$_r$—NR$^2$—CO—(CH$_2$)$_s$—, —O—(CH$_2$)$_r$—NR$^2$—CO—O—(CH$_2$)$_s$—, —O—(CH$_2$)$_r$—CO—O—(CH$_2$)$_s$—, —O—(CH$_2$)$_r$—O—(CH$_2$)$_s$—O—, —O—(CH$_2$)$_r$—NR$^2$—CO—(CH$_2$)$_s$—O—, —O—(CH$_2$)$_r$—NR$^2$—CO—O—(CH$_2$)$_s$—O—, —CO—O—(CH$_2$)$_r$—O—(CH$_2$)$_s$—, —CO—O—(CH$_2$)$_r$—O—(CH$_2$)$_s$—O—, wherein r and s are each an integer from 1 to 20, but especially from 2 to 12, with the proviso that r+s≦21, especially ≦15, and wherein R$^2$ represents hydrogen or lower alkyl.

More preferred "spacer units" S$^1$ are a single bond, —CH$_2$—, a straight-chain alkylene grouping represented by —(CH$_2$)$_r$—, and also —(CH$_2$)$_r$—O—, —(CH$_2$)$_r$—CO—O—, —(CH$_2$)$_r$—O—CO—, —(CH$_2$)$_r$—CO—NH—, —(CH$_2$)$_r$—NH—CO—, —(CH$_2$)$_r$—NH—CO—(CH$_2$)$_s$—, —(CH$_2$)$_r$—NH—CO—O—(CH$_2$)$_s$—, —(CH$_2$)$_r$—O—(CH$_2$)$_s$—O—, —(CH$_2$)$_r$—NH—CO—(CH$_2$)$_s$—O—, —(CH$_2$)$_r$—NH—CO—O—(CH$_2$)$_s$—O—, and if attached to a polystyrene, polyimide, polyamic acid or polyamic acid ester backbone also —O—(CH$_2$)$_r$—, —CO—O—(CH$_2$)$_r$—, —CO—NH—(CH$_2$)$_r$—, —O—CO—(CH$_2$)$_r$—, —O—CO—(CH$_2$)$_r$—CO—O—, —O—(CH$_2$)$_r$—O—CO—, —O—(CH$_2$)$_r$—CO—NH—, —O—(CH$_2$)$_r$—NH—CO—, —CO—O—(CH$_2$)$_r$—O—, —CO—NH—(CH$_2$)$_r$—O—, —O—(CH$_2$)$_r$—O—, —O—(CH$_2$)$_r$—NH—CO—(CH$_2$)$_s$—, —O—(CH$_2$)$_r$—O—(CH$_2$)$_s$—O—, —O—CO—(CH$_2$)$_r$—O—(CH$_2$)$_s$—O—, —CO—O—(CH$_2$)$_r$—O—(CH$_2$)$_s$—O—, —O—(CH$_2$)$_r$—NH—CO—(CH$_2$)$_s$—O—, —O—CO—(CH$_2$)$_r$—NH—CO—(CH$_2$)$_s$—O—, wherein r and s are each an integer from 2 to 12 and the sum of r+s≦15.

Most preferred "spacer units" of S$^1$ are a single bond, —CH$_2$—, a straight-chain alkylene grouping represented by —(CH$_2$)$_r$—, and also —(CH$_2$)$_r$—O—, —(CH$_2$)$_r$—CO—O—, —(CH$_2$)$_r$—O—CO—, —(CH$_2$)$_r$—O—(CH$_2$)$_s$—O—, —(CH$_2$)$_r$—NH—CO—O—(CH$_2$)$_s$—O—, and if attached to a polystyrene, polyimide, polyamic acid or polyamic acid ester backbone also —O—(CH$_2$)$_r$—, —CO—O—(CH$_2$)$_r$—, —O—CO—(CH$_2$)$_r$—, —O—CO—(CH$_2$)$_r$—CO—O—, —O—(CH$_2$)$_r$—O—CO—, —CO—O—(CH$_2$)$_r$—O—, —O—(CH$_2$)$_r$—O—, —O—(CH$_2$)$_r$—O—(CH$_2$)$_s$—O—, —O—CO—(CH$_2$)$_r$—O—(CH$_2$)$_s$—O—, —CO—O—(CH$_2$)$_r$—O—(CH$_2$)$_s$—O—, wherein r and s are each an integer from 2 to 8 and the sum of r+s≦8.

Examples of preferred "spacer units" S$^1$ are 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propylene-oxy, 3-propyleneoxycarbonyl, 2-ethylene-carbonyloxy, 4-butylene-oxy, 4-butyleneoxy-carbonyl, 3-propylene-carbonyloxy, 5-pentyleneoxy, 5-pentyleneoxycarbonyl, 4-butylene-carbonyl-oxy, 6-hexyleneoxy, 6-hexylene-oxy-carbonyl, 5-pentylene-carbonyloxy, 7-heptyleneoxy, 7-heptylene-oxy-carbonyl, 6-hexylene-carbonyloxy, 8-octyleneoxy, 8-octyleneoxycarbonyl, 7-heptylene-carbonyl-oxy, 9-nonyleneoxy, 9-nonyleneoxycarbonyl, 8-octylene-carbonyloxy, 10-decylene-oxy, 10-decylene-oxy-carbonyl, 9-nonylene-carbonyloxy, 11-undecyleneoxy, 11-undecylene-oxycarbonyl, 10-decylene-carbonyloxy, 12-dodecyleneoxy, 12-dodecylene-oxy-carbonyl, 11-undecylene-carbonyloxy, 3-propyleneimino-carbonyl, 4-butyleneimino-carbonyl, 5-pentyleneimino-carbonyl, 6-hexyleneimino-carbonyl, 7-heptyleneimino-carbonyl, 8-octyleneimino-carbonyl, 9-nonyleneimino-carbonyl, 10-decyleneimino-carbonyl, 11-undecyleneimino-carbonyl, 12-dodecyleneimino-carbonyl, 2-ethylene-carbonyl-imino, 3-propylene-carbonyl-imino, 4-butylene-carbonyl-imino, 5-pentylene-carbonyl-imino, 6-hexylene-carbonyl-imino, 7-heptylene-carbonyl-imino, 8-octylene-carbonyl-imino, 9-nonylene-carbonyl-imino, 10-decylene-carbonyl-imino, 11-undecylene-carbonyl-imino, 6-(3-propylene-imino-carbonyl-oxy)-hexylene, 6-(3-propylene-oxy)-hexylene, 6-(3-propylene-oxy)-hexyleneoxy, 6-(3-propylene-imino-carbonyl-oxy)-hexyleneoxy, 6-(3-propylene-imino-carbonyl)hexyl, 6-(3-propyleneimino-carbonyl)hexyloxy, 1,2-ethylene-dioxy, 1,3-propylenedioxy, 1,4-butylenedioxy, 1,5-pentylene-dioxy, 1,6-hexylene-dioxy, 1,7-heptylenedioxy, 1,8-octylene-dioxy, 1,9-nonylenedioxy, 1,10-decylene-dioxy, 1,11-undecylenedioxy, 1,12-dodecylene-dioxy and the like.

Preferred groups for Z$^1$ and Z$^2$ are a single covalent bond or a straight-chain or branched alkylene residue which is unsubstituted, mono-substituted or poly-substituted by fluoro, having 1 to 8 carbon atoms, wherein one or more non adjacent CH$_2$ groups may independently be replaced by —O—, —CO—, —CO—O—, —O—CO—, —NR$^2$—CO—, —CO—NR$^2$—, —NR$^2$—CO—O—, —O—CO—NR$^2$—, —CH=CH—, —C≡C—, —O—CO—O—, with the proviso that —CH=CH— and —C≡C— are not in conjugation with aromatic rings and wherein R$^2$ represents a hydrogen atom or lower alkyl.

More preferred groups for Z$^1$ and Z$^2$ are a single covalent bond or a straight-chain or branched alkylene residue, having 1 to 6 carbon atoms, wherein one or more non adjacent CH$_2$ groups may independently be replaced by —O—, —CO—O—, —O—CO—, —CH=CH—, —C≡C—, —O—CO—O—, with the proviso that —CH=CH— and —C≡C— are not in conjugation with aromatic rings.

Most preferred groups for Z$^1$ and Z$^2$ are a single covalent bond or a straight-chain or branched alkylene residue, having 1 to 4 carbon atoms, wherein one or two non adjacent CH$_2$ groups may independently be replaced by —O—, —CO—O—, —O—CO—.

Preferably R$^1$ is a hydrogen atom, a fluoro atom, a chloro atom, a cyano group or a straight-chain or branched alkyl residue which is unsubstituted, mono-substituted by cyano or halogeno, or poly-substituted by fluoro, having 1 to 18 carbon atoms, wherein one or more non adjacent CH$_2$ groups may independently be replaced by —O—, —CO—, —CO—O—, —O—CO—, —NR$^2$—CO—, —CO—NR$^2$—, —NR$^2$—CO—O—, —O—CO—NR$^2$—, —CH=CH—, —C≡C—, —O—CO—O—, with the proviso that —CH=CH— and —C≡C— are not attached directly to an aromatic ring and wherein R$^2$ represents a hydrogen atom or lower alkyl.

More preferred groups of R$^1$ are a hydrogen atom, a fluoro atom, a chloro atom, a cyano group or a straight-chain or branched alkyl residue which is unsubstituted having 1 to 12 carbon atoms, wherein one or more non adjacent CH$_2$ groups may independently be replaced by —O—, —CO—, —CO—O—, —O—CO—, —CH=CH—, —C≡C—, —O—CO—O—, with the proviso that —CH=CH— and —C≡C— are not attached directly to an aromatic ring.

It is preferred that n and m are each chosen such that the total number of rings in the substructure of formula I are 2-5 including the number of rings in a condensed system.

More preferred are substructures of formula I where m and n are chosen such that the total number of rings including the rings in a condensed system are 3 or 4.

It is preferred that q is 1 except where ring A$^1$ is chosen from a radical of a di- or triterpene or a steroid. In the latter case q has the value of 0.

The side chain copolymer of the invention comprises in addition to the side chains of formula I side chains incorporating photoreactive groups which are able to undergo photocyclisation. Such side chains are commonly used in polymers for photoorientation and are known to the person skilled in the art, e.g. from EP-A-0611786, WO-A-96/10049, EP-A-0763552, EP-A-0860455, WO-A-00/59966 and PCT/EP00/06788.

Preferably such side chains incorporating photoreactive groups are substructures of the general formula II or III

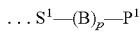   II

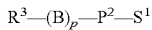   III wherein
the broken line indicates the linkage to the polymer main chain;
$S^1$ has the meaning given above;
B denotes an aromatic or alicyclic group which is unsubstituted or substituted by fluorine, chlorine, cyano or by a straight-chain or branched alkyl residue which is unsubstituted, mono-substituted by cyano or halogeno, or poly-substituted by halogeno, having 1 to 18 carbon atoms and wherein one or more non adjacent $CH_2$ groups may independently be replaced by Q, where Q and $R^2$ have the meaning given above;
$P^1$, $P^2$ signify photoreactive groups;
$R^3$ is a hydrogen atom, or a straight-chain or branched alkyl residue which is unsubstituted, mono-substituted by cyano or halogeno, or poly-substituted by halogeno, having 1 to 18 carbon atoms, wherein one or more $CH_2$ groups may independently be replaced by Q, where Q and $R^2$ have the meaning given above; and
p is 0 or 1.

Preferred photoreactive groups $P^1$ and $P^2$ comprise groups which undergo a photocyclisation and have the general formula IV and V respectively

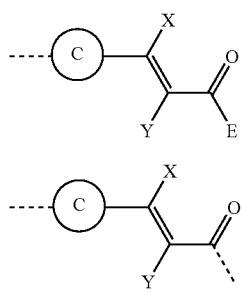

wherein
the broken line indicates the linkage to B or $S^1$ respectively;
C represents phenylene which is unsubstituted or substituted by fluorine, chlorine or cyano, or by a cyclic, straight-chain or branched alkyl residue which is unsubstituted, mono-substituted by cyano or halogeno, or poly-substituted by halogeno, having 1 to 18 carbon atoms and wherein one or more non adjacent $CH_2$ groups may independently be replaced by Q, where Q and $R^2$ have the meaning given above, or C further represents pyrimidine-2,5-diyl, pyridine-2,5-diyl, 2,5-thiophenylene, 2,5-furanylene, or 1,4- or 2,6-naphthylene;
E represents —$OR^4$, —$NR^5R^6$, or an oxygen atom linked to ring C in the ortho-position to form a coumarin unit wherein $R^4$, $R^5$ and $R^6$ are a hydrogen atom or a cyclic, straight-chain or branched alkyl residue which is unsubstituted, mono-substituted by halogeno, or poly-substituted by halogeno, having 1 to 18 carbon atoms and wherein one or more $CH_2$ groups may independently be replaced by —O—, —CO—, —CO—O—, —O—CO—, —CH=CH—, with the proviso that oxygen atoms are not directly attached to each other, or $R^5$ and $R^6$ are linked together to form an alicyclic ring with 5 to 8 atoms; and
X, Y each independently of the other represents hydrogen, fluorine, chlorine, cyano, alkyl optionally substituted by fluorine having from 1 to 12 carbon atoms in which optionally one or more non-adjacent $CH_2$ groups are replaced by —O—, —CO—O—, —O—CO— and/or —CH=CH—.

More preferred groups $P^1$ and $P^2$ have the general formula IV and V respectively wherein:
C represents phenylene which is unsubstituted or substituted by a straight-chain or branched alkyl residue which is unsubstituted or mono- or polysubstituted by fluorine, having 1 to 18 carbon atoms and wherein one or more non adjacent $CH_2$ groups may independently be replaced by —O—, —CO—, —CO—O—, —O—CO, —CH=CH—, or C further represents 2,5-furanylene, 1,4- or 2,6-naphthylene;
E represents —$OR^4$ or —$NHR^5$, wherein $R^4$ and $R^5$ are a cyclic, straight-chain or branched alkyl residue which is unsubstituted or mono- or polysubstituted by fluorine, having 1 to 18 carbon atoms and wherein one or more non adjacent $CH_2$ groups may independently be replaced by —O—; and
X, Y are hydrogen atoms.

The polymer backbones of the copolymer according to the invention, which the side chains of formula I and the photoreactive side chains are attached to, are those which are generally used for photoaligning polymers and which are well known to a person skilled in the art. Examples have been published e.g. in EP-A-0611786, WO-A-96/10049, EP-A-0763552, EP-A-0860455, WO-A-99/15576 and WO-A-00/59966.

Preferred polymer backbones in the present invention are polymers formed from acrylate, methacrylate, 2-chloroacrylate, 2-phenylacrylate, optionally N-lower alkyl substituted acrylamide, methacrylamide, 2-chlorcacrylamide, 2-phenylacrylamide, vinyl ether, vinyl ester, styrene derivatives, siloxanes, imides, amic acids and their esters, amidimides, maleic acid derivatives, fumaric acid derivatives.

More preferred are polymers formed from acrylate, methacrylate, optionally N-lower-alkyl-substituted acrylamide, methacrylamide, vinyl ether, vinyl ester, styrene derivatives, imides, amic acids and their esters and amidimides.

Especially preferred are polymers formed from acrylate, methacrylate, optionally N-lower-alkyl-substituted acrylamide, methacrylamide, vinyl ether, vinyl ester, and styrene derivatives.

Most preferred are polyacrylate, polymethacrylate, polyvinl ether and polyvinyl ester.

The proportion of the side groups of formula I relative to the photoreactive side groups in a copolymer according to the invention is usually <50, preferably <25%, and most preferred <20%.

The inventive copolymer can be used alone or preferably in mixtures with at least one other photoreactive polymer or copolymer. A further aspect of the invention therefore comprises photoreactive mixtures which contain a copolymer of the present invention. Mixing partners are components known for photoaligning properties, for instance as exemplified in EP-A-0611786, WO-A-96/10049, EP-A-0763552, EP-A-0860455, WO-A-99/15576, WO-A-00/59966 and PCT/EP00/06788.

Preferred components for mixtures together with the copolymer of the invention are photoreactive polymers based on acrylate, methacrylate, optionally N-lower-alkyl-substituted acrylamide, methacrylamide, vinyl ether, vinyl ester, styrene derivatives, imides, amic acids and their esters and amidimides where the side chains contain as photoreactive groups substructures of formula II or III.

More preferred components for mixtures together with the copolymers of the invention are photopolymers based an imides, amic acids and amic acid esters incorporating cinnamic acid or coumarin derivatives as photoreactive side chains.

Most preferred are mixtures containing a copolymer of the present invention based on polyacrylate, polymethacrylate, polyvinl ether and polyvinyl ester together with a photoreactive polymer based on polyimide, polyamic acid and polyamic acid ester.

The content of the copolymer according to the invention in the mixtures can vary in a broad range, depending on the miscibility of the components. Preferred are <25 wt %, more preferred <15 wt %, most preferred <10 wt % of the copolymer.

The polymer of formula I is characterized by being readily accessible. It may be prepared using methods that are known to a person skilled in the art.

The inventive copolymer, with acrylate, methacrylate, acrylamide, methacrylamide and styrene derivative as repeating monomer unit, can be prepared in principle according to two different processes. In addition to the direct polymerization of pre-finished monomers there exists the possibility of polymer-analogous reaction of reactive photoactive derivatives with functional polymers.

For the direct polymerization, the monomers and the comonomers are firstly prepared separately from the individual components. The formation of the copolymers is subsequently effected in a manner known per se under the influence of UV radiation or heat or by the action of radical or ionic catalysts. Potassium peroxodisulfate, dibenzoyl peroxide, azobisisobutyro-nitrile or di-tert-butyl peroxide are examples of radical initiators. Ionic catalysts are alkali-organic compounds such as phenyllithium or naphthylsodium or Lewis acids such as $BF_3$, $AlCl_3$, $SnCl_3$ or $TiCl_4$. The monomers can be polymerized in solution, suspension, emulsion or substance.

In the second process a polymer can also be produced in a polymer-analogous reaction from a pre-finished functional polymer and suitable functionalized side-chain derivatives. Many known processes such as, for example, esterification, trans-esterification, amidation or the etherification are suitable for polymer-analogous reactions.

Such copolymers have a molecular weight MW between 1 000 and 5 000 000, preferably however between 5 000 and 2 000 000, especially advantageously however between. 10 000 and 1 000 000.

The preparation of the polyamic acids and polyimides according to the invention is generally carried out analogously to the methods frequently described in the polyimide literature, for example in Plast. Eng. 36 (1996) (Polyimides, fundamentals and applications).

For example, the polycondensation reaction for the preparation of the polyamic acids is carried out in solution in a polar aprotic organic solvent, such as γ-butyrolactone, N,N-dimethylacetamide, N-methylpyrrolidone or N,N-dimethylformamide. In most cases equimolar amounts of the dianhydride and the diamine are used, that is to say one amino group per anhydride group. If it is desired to stabilize the molecular weight of the polymer, it is possible for that purpose to add an excess or a less-than-stoichiometric amount of one of the two components or to add a monofunctional com-pound in the form of a dicarboxylic acid monoanhydride or in the form of a monoamine. Examples of such monofunctional compounds are maleic acid anhydride, phthalic acid anhydride, aniline and so on. The reaction is carried out preferably at a temperature of less than 100° C.

For the preparation of mixtures containing comparatively apolar polymers like polyacrylates, polymetacrylates, polystyrols with polar polymers like polyamic acids, polyimides and polyamic acid esters, the above polycondensation reaction can also be performed in the presence of the less polar polymer.

The cyclisation of the polyamic acids to form the polyimides alone or in mixture with other types of polymers can be carried out by heating, that is to say by condensation with removal of water or by other imidisation reactions with reagents. When carried out purely thermally, the imidisation of the polyamic acids is not always complete, that is to say the resulting polyimides may still contain proportions of polyamic acid. The imidisation reactions are generally carried out at a temperature of from 60 to 250° C., but preferably at less than 200° C. In order to achieve imidisation at rather lower temperatures there are additionally mixed into the reaction mixture reagents that facilitate the removal of water. Such reagents are, for example, mixtures consisting of acid anhydrides, such as acetic acid anhydride, propionic acid anhydride, phthalic acid anhydride, trifluoroacetic acid anhydride, and tertiary amines, such as triethylamine, trimethylamine, tributylamine, pyridine, N,N-dimethylaniline, lutidine, collidine etc. The amount of reagents used in that case is preferably at least two equivalents of amine and four equivalents of acid anhydride per equivalent of polyamic acid to be condensed.

The imidisation reaction can be carried out before or alternatively only after application to a support. The latter variant is preferred especially when the polyimide in question has poor solubility in the customary solvents.

Polyamic acids and polyimides according to the present invention have an intrinsic viscosity preferably in range of 0.05 to 10 dL/g, more preferably 0.05 to 5 dL/g. Herein, the intrinsic viscosity ($\eta_{inh}=\ln \eta_{rel}/C$) is determined by measuring a solution containing a polymer in a concentration of 0.5 g/100 ml for its viscosity at 30° C. using N-methyl-2-pyrrolidone as solvent.

The number of monomer building blocks from which the polymer chains according to the invention are synthesized can vary within a wide range. It is generally from 2 to 2000, but especially from 3 to 200.

The copolymer and the polymer mixtures according to the invention may contain additives such as silane-containing compounds and epoxy-containing crosslinking agents for further improving the adhesion of the polymer to a substrate. Example for silane adhesion promoters were described in the literature, for example Plast. Eng. 36 (1996) (Polyimides, fundamentals and applications). The above epoxy-containing crosslinking agent preferably includes 4,4'-methylene-bis-(N,N-diglycidylaniline), trimethylolpropane triglycidyl ether, benzene-1,2,4,5-tetracarboxylic acid 1,2,4,5-N,N'-diglycidyldiimide, polyethylene glycol diglycidyl ether, N,N-diglycidyl-cyclohexylamine and the like.

The copolymer and the polymer mixtures according to the invention may contain additives such as a photosensitizer, a photoradical generator and/or a cationic photoinitiator.

Example for such additives were 2,2-dimethoxy-phenyletha-none, mixture of diphenylmethanone and N,N-dimethylben-zenamine or ethyl 4-(dimethylamino)benzoate, xanthone, thioxanthone, IRGACURE™ 184, 369, 500, 651 and 907 (Ciba), Michler's ketone, triaryl sulfonium salt and the like.

The copolymer and the polymer mixtures according to the invention can be applied to a support and, after any imidisation step which may be necessary, crosslinked by irradiation with linearly polarized light, that is to say by cycloaddition of their side-chains containing the photoreactive group, there being obtained, depending upon the direction of polarization of the light radiated in, a preferred direction of orientation and of the angle of tilt for liquid crystals that are bought into contact with the orientation layer. By spatially selective irradiation of the molecular units according to the invention it is hence possible for very specific regions of a surface to be aligned and provided with a defined angle of tilt. At the same time the orientation layer so produced is also stabilized by the cycloaddition.

The present invention therefore also relates to the use of the polymer according to the invention as orientation layer for liquid crystals, and to their use in liquid crystal cells of displays, and for layers of optical constructional elements, especially in the production of hybrid layer elements.

Such orientation layers can be produced, for example, by first preparing a solution of the polymer material, which is then applied to a support such that homogeneous layers of preferably 0.05 to 50 μm thickness are produced. The support may optionally be provided with further constructional elements such as an electrode layer (for example a glass plate coated with indium-tin oxide (ITO)). For applying the solution of the polymer material, different coating techniques may be used like spincoating, miniscuscoating, wirecoating, slotcoating, off setprinting, flexoprinting, gravurprinting. Then, optionally after prior imidisation, the regions to be oriented can be irradiated, for example, with a high-pressure mercury vapour lamp, a xenon lamp or a pulsed UV laser, using a polarizer and optionally a mask for creating patterns or structures. The irradiation time is dependent upon the material and the output of the light source used. The dimerisation can also be carried out by irradiation of the homogeneous layer using filters that, for example, allow only the radiation suitable for the cross-linking reaction to pass through.

Further aspects of the present invention are:

a) Optical or electro-optical devices having at least one orientation layer, characterized in that the orientation layer contains photoreactive copolymers incorporating side chains of formula I; and b) Use of photoreactive copolymers incorporating side chains of formula I in the construction of unstructured and structured optical elements and multi-layer systems.

The polymer in accordance with the invention is illustrated in more detail by the following Examples. In the Examples $T_g$ signifies the glass temperature. Relative molecular weights ($M_n$) were determined by gel permeation chromatography (GPC) at 35° C. using THF as solvent with polystyrene standard.

EXAMPLE 1

Poly-cholesteryl-2-methacrylate-co-6-[4-(2-methoxycarbonylvinyl)phenyloxy]hexyl-2-methacrylate (1:4)

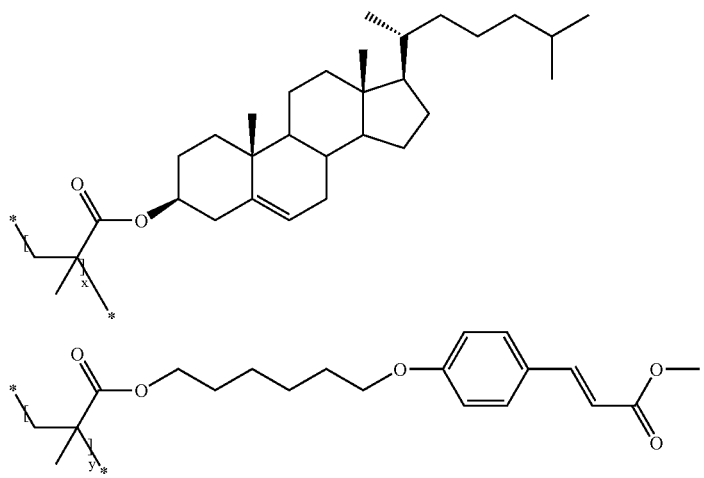

A mixture of 0.115 g (0.25 mmol) cholesteryl-2-methacrylate and 0.35 g (1.01 mmol) 6-[4-(2-methoxycarbonylvinyl) phenyloxy]hexyl-2-methacrylate (preparation according to EP-A-0763552) and 3.1 mg (0.032 mmol) α,α'-azobicyclohexanecarbonitrile (ACN) in 3.2 ml dry dimethylformamide (DMF) was degassed in a sealable tube. The tube was then sealed under argon and stirred at 80° C. for 15 h. Then the reaction mixture was diluted with 5 ml tetrahydrofurane (THF), precipitated into 400 ml methanol and collected by filtration. The polymer was reprecipitated from THF (4.0 ml) into 300 ml methanol to yield 0.35 g poly-(cholesteryl-2-methacrylate)-co-6-[4-(2-methoxycarbonylvinyl)-phenyloxy]-hexyl-2-methacrylate (1:4) as a white solid; $M_n$=1.85× $10^5$, pdi=4.23.

The cholesteryl-2-methacrylate used as starting material was prepared in accordance with the following procedure:

To a solution of 2 g (5.2 mmol) cholesterol, 0.49 g (5.7 mmol) 2-methacrylic acid and 0.09 g N,N-dimethylaminopyridine in 50 ml $CH_2Cl_2$ at 10° C. a solution of 1.5 g dicyclohexylcarbodiimide (DCC) in 20 ml $CH_2Cl_2$ was slowly added. The solution was then stirred during 15 h at room temperature, then filtered and the solution subsequently evaporated to dryness. Chromatography of the residue over silicagel with ethylacetate/hexane (1:9) gave 1.2 g of the acrylate as a colorless solid.

The following compounds were prepared in an analogous manner:

Poly-cholesteryl-2-methacrylate-co-6-[4-(2-methoxycarbonylvinyl)phenyloxy]hexyl-2-methacrylate (1:9), $M_n=2.3\times10^5$, pdi=2.47;

Poly-2-(cholesterylcarbamoyl)ethyl-2-methacrylate-co-6-[4-(2-methoxycarbonylvinyl)phenyloxy]hexyl-2-methacrylate (1:4);

Poly-cholesteryl-2-methacrylate-co-6-[4-(2-methoxycarbonylvinyl)benzoyloxy]hexyl-2-methacrylate (1:4), $M_n=7.6\times10^4$, pdi=2.46;

Poly-cholesteryl-2-methacrylate-co-6-[4-(2-methoxycarbonylvinyl)benzoyloxy]hexyl-2-methacrylate (1:9 $M_n=3.7\times10^5$, pdi=7.03;

Poly-cholesteryl-2-methacrylate-co-6-[2-methoxy-4-(2-methoxycarbonylvinyl)phenyloxy]hexyl-2-methacrylate (1:5);

Poly-cholesteryl-2-methacrylate-co-6-[2-methoxy-4-(2-methoxycarbonylvinyl)phenyloxy]hexyl-2-methacrylate (1:9 g);

Poly-6-(cholesteryl)hexyl-2-methacrylate-co-6-[4-(2-methoxycarbonylvinyl)phenyloxy]hexyl-2-methacrylate (1:9);

Poly-6-(cholesteryl)hexyl-2-methacrylate-co-6-[4-(2-methoxycarbonylvinyl)phenyloxy]hexyl-2-methacrylate (1:9);

Poly-all trans-(2-(phenyl)decahydro-6-naphthyl)methyl-co-6-[4-(2-methoxycarbonylvinyl)phenyloxy]hexyl-2-methacrylate (1:4);

Poly-all trans-[2-(phenyl)decahydro-6-naphthyl]methyl-co-6-[4-(2-methoxycarbonylvinyl)benzoyloxy]hexyl-2-methacrylate (1:4);

Poly-all trans-[6-[2-(phenyl) decahydro-6-naphthyl]methyloxy]hexyl-co-6-[4-(2-methoxy-car-bonylvinyl)benzoyloxy]hexyl-2-methacrylate (1:4).

EXAMPLE 2

Poly-3-[(E)-4-[(E)-4-(4-Methylphenyl)cyclohexyl]cyclohexyl]propyl-2-methacrylate-co-2-[4-(2-methoxycarbonylvinyl)phenyloxy]ethyl-2-methacrylate (1:3)

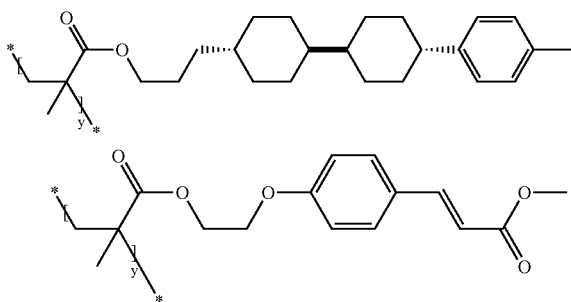

A mixture of 0.31 g (0.8 mmol) 3-[trans-4-[trans-4-(4-methylphenyl)cyclohexyl]cyclohexyl]propyl-2-methacrylate and 0.7 g (2.41 mmol) 2-[4-(2-methoxycarbonyl-vinyl)phenyloxy]ethyl-2-methacrylate (preparation according to EP-A-0763552) and 5.3 mg (0.032 mmol) α,α'-azoisobutyronitrile (AIBN) in 19 ml dry tetrahydrofuran (THF) was degassed in a sealable tube. The tube was then sealed under argon and stirred at 57° C. for 15 h. The polymer was precipitated into 500 ml diethyl ether and collected by filtration. The polymer was reprecipitated from THF (6.0 ml) into 300 ml methanol to yield 0.58 g (80%) poly-3-[(E)-4-[(E)-4-(4-methylphenyl) cyclohexyl]cyclohexyl]propyl-2-methacrylate-co-2-[4-(2-methoxycarbonylvinyl)phenyloxy]ethyl-2-methacrylate (1:3) as a white solid; $M_n=8.15\times10^4$, pdi=2.16.

The 3-[trans-4-[trans-4-(4-methylphenyl) cyclohexyl]cyclohexyl]-propyl-2-methacrylate used as starting material was prepared in accordance with the following procedure:

To a solution of 3 g (9.54 mmol) 3-[trans-4-[trans-4-(4-methylphenyl) cyclohexyl]cyclohexyl]propanol, prepared according to U.S. Pat. No. 5,454,974, 1.94 g 2-methacrylic acid and 0.33 g N,N-dimethylaminopyridine in 60 ml $CH_2Cl_2$ at 0° C. a solution of 5.5 g dicyclohexylcarbodiimide (DCC) in 20 ml $CH_2Cl_2$ was slowly added. The solution was then stirred during 72 h at room temperature. Then the organic phase was filtered washed with water, dried over $Na_2SO_4$, filtered and evaporated to dryness. Chromatography of the residue over silicagel with hexane/ether (19:1) gave 2.73 g of the acrylate as a colorless solid.

The following compounds were prepared in an analogous manner:

Poly-3-[trans-4-[trans-4-(4-methylphenyl)cyclohexyl]cyclohexyl]-propyl-2-methacrylate-co-2-[2-methoxy-4-(2-methoxycarbonylvinyl)phenyloxy]ethyl-2-methacrylate (1:3), $M_n=9.1\times10^4$, pdi=2.08;

Poly-3-[trans-4-[trans-4-(4-methylphenyl)cyclohexyl]cyclohexyl]-propyl-2-methacrylate-co-2-[4-(2-methoxycarbonylvinyl)phenyloxy]ethyl-2-methacrylate (1:9);

Poly-3-[trans-4-[trans-4-(4-methylphenyl)cyclohexyl]cyclohexyl]-propyl-2-methacrylate-co-2-[2-methoxy-4-(2-methoxycarbonylvinyl)phenyloxy]ethyl-2-methacrylate (1:9), $M_n=9.8\times10^4$, pdi=2.58;

Poly-3-[trans-4-[trans-4-(4-methylphenyl)cyclohexyl]cyclohexyl]-propyl-2-methacrylate-co-6-[4-(2-methoxycarbonylvinyl)benzoyloxy]hexyl-2-methacrylate (1:9);

Poly-3-[trans-4-[-4-(4-cyanophenyl)phenyl]cyclohexyl]propyl-2-methacrylate-co-2-[4-(2-methoxycarbonylvinyl)phenyloxy]ethyl-2-methacrylate (1:3), $M_n=8.75\times10^4$, pdi=2.27;

Poly-3-[trans-4-[-4-(4-cyanophenyl)phenyl]cyclohexyl]propyl-2-methacrylate-co-2-[2-methoxy-4-(2-methoxycarbonylvinyl)phenyloxy]ethyl-2-methacrylate (1:3), $M_n=7.9\times10^4$, pdi=2.17;

Poly-3-[trans-4-[trans-4-(3,4-difluorophenyl)cyclohexyl]cyclohexyl]propyl-2-methacrylate-co-2-[4-(2-methoxycarbonylvinyl)phenyloxy]ethyl-2-methacrylate (1:3), $M_n=7.4\times10^4$, pdi=2.29;

Poly-3-[trans-4-[trans-4-(3,4-difluorophenyl)cyclohexyl]cyclohexyl]propyl-2-methacrylate-co-2-[2-methoxy-4-(2-methoxycarbonylvinyl)phenyloxy]ethyl-2-methacrylate (1:3), $M_n=8.5\times10^4$, pdi=2.14;

Poly-3-[trans-4-[trans-4-(3,4-difluorophenyl)cyclohexyl]cyclohexyl]-propyl-2-methacrylate-co-2-[2-methoxy-4-(2-methoxycarbonylvinyl)phenyloxy]ethyl-2-methacrylate (1:9);

Poly-3-[trans-4-(4-methoxyphenyl)cyclohexyl]propyl-2-methacrylate-co-2-[2-methoxy-4-(2-methoxycarbonylvinyl)phenyloxy]ethyl-2-methacrylate (1:3);

Poly-3-E[trans-4-(4-methoxyphenyl)cyclohexyl]propyl-2-methacrylate-co-2-[2-methoxy-4-(2-methoxycarbonylvinyl)phenyloxy]ethyl-2-methacrylate (1:9).

EXAMPLE 3

Polyimide 0.199 g (1.02 mmol) of 1,2,3,4-cyclobutantetracarboxylic acid dianhydride was added to a solution of 0.059 g (0.113 mmol) of 3,5-diaminobenzoic acid cholesteryl ester and 0.45 g (1.02 mmol) of 3,5-diaminobenzoic acid 6-[2-methoxy-4-(2-methoxycarbonylvinyl)phenyloxy]hexyl ester in 3.5 ml of tetrahydrofuran stirring was then carried out at 23° C. for 2 hours. Then another 0.022 g (0.113 mmol) of 1,2,3,4-cyclobutantetracarboxylic acid dianhydride were added. The mixture was subsequently allowed to react for 22 hours at room temperature. The polymer mixture was diluted with 3.5 ml THP, precipitated into 200 ml diethyl ether and collected by filtration. The polymer was reprecipitated from THF (10 ml) after filtration into 600 ml water to yield, after drying at room temperature under vacuum, 0.687 g of polyamic acid in the form of a beige powder; [η]=0.57 dL/g.

The 3,5-diaminobenzoic acid cholesteryl ester and the 3,5-diaminobenzoic acid 6-[2-methoxy-4-(2-methoxycarbonylvinyl)phenyloxy]hexyl ester used as starting material were prepared in accordance with the following procedure:

3,5-Dinitrobenzoic Acid Cholesteryl Ester

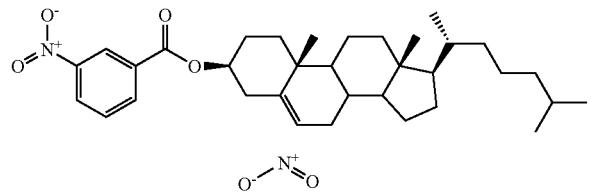

3.89 g (10.1 mmol) Cholesterol, 2.44 g (10.5 mmol) 3,5-dinitrobenzoyl chloride, 12.3 mg 4-dimethylaminopyridine were dissolved in 76 ml dichloromethane. The solution was subsequently cooled to 0° C. and then 4.1 ml pyridine was added dropwise, in the course of 25 minutes. After 4.75 hours at 0° C. the reaction mixture was partitioned between dichloromethane and water; the organic phase was washed with a sat. solution of sodium bicarbonate and repeatedly with water, dried over sodium sulfate, filtered and concentrated by rotary evaporation. Chromatography of the residue on 100 g silica gel using Toluene yielded 5.56 g (95%) 3,5-dinitrobenzoic acid cholesteryl ester as yellow powder.

3,5-Diaminobenzoic Acid Cholesteryl Ester

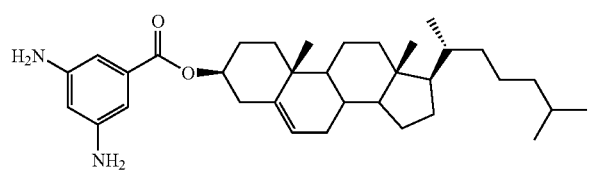

5.54 g (9.54 mmol) of 3,5-dinitrobenzoic acid cholesteryl ester and 2.0 g (37.39 mmol) of ammonium chloride were suspended in 80 ml of a mixture consisting of methanol:water 9:1. 12.48 g (191 mmol) of zinc powder were then added in one portion and the resulting mixture stirred at 40° C. After 4.5 hour 20 ml of another 20 ml of methanol:water 9:1 were added to the thick suspension and the reaction allowed to continue during 4.25 hours. The reaction mixture was then cooled to room temperature diluted with 100 ml methanol/water (9:1) and then partitioned between dichloromethane and water. The organic phase was washed with a saturated sodium bicarbonate solution and repeatedly with water, then dried over sodium sulfate, filtered and concentrated by evaporation. Chromatography of the residue on 100 g of silica gel using toluene/ethyl acetate (7.3) gave after drying under high vacuum 2.82 g of a pasty compound.

EXAMPLE 4

Preparation of Cell with High Tilt

A two percent by weight solution of the photoreactive copolymer Poly-3-[trans-4-[trans-4-(4-methylphenyl)cyclohexyl]cyclohexyl]propyl-2-methacrylate-co-2-[2-methoxy-4-(2-methoxycarbonylvinyl)phenyloxy]ethyl-2-methacrylate (1:3) (preparation see Example 1) was prepared using cyclopentanone as a solvent. The solution was stirred for 30 minutes at room temperature.

This solution was spin-coated at 2000 rpm onto two ITO (indium-tin-oxide) coated glass plates, which were then dried for 30 minutes at 150° C.

Both substrates were subsequently exposed for one minute to the polarized ultraviolet light of a 350 W high pressure mercury lamp. The intensity of the uv-light at the substrates position was measured as 1.1 mW/cm².

With the coated sides facing inwards, the two plates were assembled into a parallel liquid crystal cell using 20 μm thick glass rods as spacers. The cell was filled with the nematic liquid crystal mixture MLC12000-000 (Merck) at 105° C., which is well above the clearing temperature ($T_C$=90° C.) of the liquid crystal mixture. The cell was subsequently cooled down to 95° C. with a cooling rate of 3° C./minute, from 95° C. to 85° C. with a cooling rate of 0.3° C./min. and from 85° C. to 25 (C with a cooling rate of 5° C./min. Above cooling procedure was applied to allow stress-free alignment of the liquid crystal mixture while passing the clearing temperature. When the cell was investigated with a polarizing microscope, the alignment quality was found to be excellent. With a tilting compensator which was introduced in the microscope the alignment of the long axis of the liquid crystal molecules was found to be parallel to the polarization direction of the uv-light which was used to photoalign the photopolymer.

The tilt angle generated in the liquid crystal material by the photoaligned layer was measured using the standard crystal rotation method. The commercial instrument TBA105 from Autronics Melchers was used for that purpose. The pretilt angle was evaluated to 89.1° respective to the surface plane.

EXAMPLE 5

Preparation of Cell with Medium Tilt

Following exactly the procedure of Example 4 a second parallel cell was prepared. However, different to Example 4, a two percent by weight solution of the photoreactive copolymer Poly-3-[trans-4-[trans-4-(3,4-difluorophenyl)cyclohexyl]cyclohexyl]-propyl-2-methacrylate-co-2-[2-methoxy-4-(2-methoxycarbonylvinyl)phenyloxy]ethyl-2-methacrylate (1:3) from Example 1 in cyclopentanone was used.

This solution was coated onto both substrates which were subsequently photoaligned using the conditions of Example 4.

From the crystal rotation measurement a pretilt angle of 49.6° was observed.

EXAMPLE 6

Preparation of an Orientation Layer Using Blends

Solution 1: A mixture of a photoreactive polyamic acid (9 parts) of the type disclosed in WO-A-99/15576—also available as ROP-401 from Rolic Research Ltd., Switzerland—and poly-(cholesteryl-2-methacrylate)-co-6-[4-(2-methoxycarbonyl-vinyl)phenyloxy]-hexyl-2-methacrylate (1:4) from Example 1 (1 part) was added to cyclopentanone to achieve a totally 2% wt solution of polymers. The mixture was then stirred at room temperature for 10 min. to get a clear solution.

Solution 2: A solution of photoreactive polyamic acid ROP-401 (97 parts) and of poly-(cholesteryl-2-methacrylate)-co-6-[4-(2-methoxycarbonylvinyl)phenyloxy]hexyl-2-methacrylate (1:4) (3 parts) was prepared according to the preparation of Solution 1.

Solution 1 and Solution 2 were each filtered over a 0.2 µm Teflon filter and applied to a glass plate, which had been coated with indium-tin oxide (ITO), in a spin-coating apparatus at 3000 rev./min. in the course of 60 seconds. The resulting film was then predried for 15 minutes at 130° C. and then imidised for 1 hour at 200° C. to form the polyimide.

The glass plate so coated was then irradiated for 15 seconds with the linearly polarized UV light of a 350 W high-pressure mercury vapor lamp. A liquid-crystalline mixture of diacrylates was then applied by spin-coating to the irradiated layer and subsequently cross-linked by isotropic UV light for 5 minutes. Under a polarization microscope, a uniaxially double-refractive layer of oriented liquid crystal molecules was observed and a contrast ratio as high as 1500:1 was measured. Using a tilt compensator it was ascertained that the direction of orientation agreed with the direction of polarization of the UV light used for the polyimide layer irradiation.

EXAMPLE 7

Production of an Orientation Layer Having a Defined High Angle of Tilt

Two glass plates coated with Solution 1 according to Example 6 were irradiated for 4 minutes with linearly polarized UV light, the direction of incidence of the light being inclined by 40° relative to the plate normal. The direction of polarization of the light was kept in the plane defined by the direction of incidence of the light and the plate normal. From both plates a cell of 20 µm spacing was built such that the illuminated surfaces were facing each other and the previous polarization directions of illumination were parallel. The cell was then filled with liquid crystal mixture MLC12000-000 from Merck at 100° C. (isotropic phase). The cell was then gradually cooled to room temperature at a rate ranging from 0.1° C./min to 2° C./min. Between crossed polarizers a uniformly oriented liquid crystal layer was observed. The tilt angle of this parallel cell, determined by crystal rotation method, was 70°.

EXAMPLE 8

Production of an Orientation Layer Having a Defined Low Angle of Tilt

Following the same procedure as in Example 7 but using Solution 2 of Example 6, a tilt angle of 5.5° has been achieved.

EXAMPLE 9

Optical Stability of Tilt Angle

The cell according to Example 8 having an orientation layer exhibiting a defined angle of tilt of 5.5° was subjected to photostability experiments using a focused halogen lamp. The light impact on the sample had a cut-off at 400 nm and an irradiance of 3 W/cm². After an irradiation time of 600 hours no significant change of the above tilt angle was observed.

EXAMPLE 10

Determination of the Voltage Holding Ratio (VRR)

Two glass plates coated with Solution 2 according to Example 6 were irradiated perpendicularly during 4 minutes with linearly polarized UV light. From both plates a cell of 10 µm spacing was built such that the illuminated surfaces were facing each other and the previous polarization directions of illumination were parallel. This cell was then maintained at 120° C. under high vacuum for 14 hours and thereafter filled with TFT liquid crystal mixture MLC12000-000 from Merck in vacuo at room temperature. Between crossed polarizers a uniformly oriented liquid crystal layer was observed. Prior to testing the voltage holding ratio (VHR) the cell was first subjected to ageing for 50 hours at 120° C. The voltage decay V (at T=20 ms) of a voltage surge of 64 µs with $V_0$ (V at t=0)=0.2 V was then measured over a period of T=20 ms. The voltage holding ratio then determined, given by VHR=$V_{rms}$ (t=T)/$V_0$, was 99% at room temperature and 88% at 80° C.

The invention claimed is:

1. A photoactive copolymer which contains side chains incorporating photoreactive groups and simultaneously side chains of formula I:

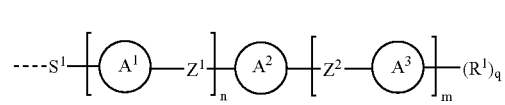

wherein
the broken line "----" according to formula I symbolizes the point of linkage to the polymer main chain;
$A^2$ is cyclopentane-1,3-diyl, cyclohexane-1,4-diyl, decalin-2,6-diyl, perhydrophenanthren-2,7-diyl, perhydroanthracen-2,6-diyl or a group incorporating a condensed ring system selected from a radical of a naturally occurring, at least bicyclic, diterpene or triterpene and from a steroid;
$A^1$, $A^3$ each independently of the other represents an aromatic or alicyclic group,
wherein the aromatic or alicyclic group is unsubstituted or substituted by fluorine, chlorine, cyano or by a cyclic, straight-chain or branched alkyl residue,
wherein the cyclic, straight-chain or branched alkyl residue is unsubstituted, mono-substituted by cyano or halogen, or poly-substituted by halogen,
wherein the straight-chain alkyl residue has 1 to 18 carbon atoms and the branched alkyl residue has 3 to 18 carbon atoms and when present the cyclic residue has 3 to 18 carbon atoms and
wherein one or more non adjacent $CH_2$ groups the cyclic, straight-chain or branched alkyl residue may independently be replaced by Q, wherein Q has the meaning given above, with the proviso that —CH═CH—, —C≡C— are not in conjugation with aromatic rings;

$S^1$ represents a single covalent bond or a spacer unit;

$Z^1$, $Z^2$ each independently represent a single covalent bond or a spacer unit;

$R^1$ is a hydrogen atom, a halogen atom, a cyano group or a straight-chain or branched alkyl residue, wherein the straight-chain or branched alkyl residue is unsubstituted, mono-substituted by cyano or halogen, or poly-substituted by halogen, wherein straight-chain alkyl residue has 1 to 18 carbon atoms and the branched alkyl residue has 3 to 18 carbon atoms, and wherein one or more non adjacent $CH_2$ groups in the straight-chain or branched alkyl residue may independently be replaced by Q, wherein Q has the meaning given above with the proviso that the groups —CH═CH—, —C≡C— are not attached directly to an aromatic ring;

n and m each independently are 0, 1 or 2 such that (m+n)≦2 and q, denotes 0 or 1, wherein the total number of rings in formula I, including the number of rings in optionally present condensed systems, is at least two and at most six, wherein the side chains incorporating photoreactive groups are substructures of the general formulae II or III

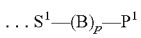     II

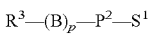     III wherein the broken line indicates the linkage to the polymer main chain;

B denotes an aromatic or alicyclic group, wherein the aromatic or alicyclic group is unsubstituted or substituted by fluorine, chlorine, cyano or by a straight-chain or branched alkyl residue, wherein the straight-chain or branched alkyl residue is unsubstituted, mono-substituted by cyano or halogen, or poly-substituted by halogen, wherein the straight-chain or branched alkyl residue has 1 to 18 carbon atoms, and wherein one or more non adjacent $CH_2$ groups in the straight-chain or branched alkyl residue may independently be replaced by Q;

$P^1$, $P^2$ independently represent photoreactive groups;

$R^3$ is a hydrogen atom, or a straight-chain or branched alkyl residue, wherein the straight-chain or branched alkyl residue is unsubstituted, mono-substituted by cyano or halogen, or poly-substituted by halogen, wherein one or more $CH_2$ groups in the straight-chain or branched alkyl residue has 1 to 18 carbon atoms, wherein one or more $CH_2$ groups in the straight-chain or branched alkyl residue may independently be replaced by Q; and p is 0 or 1, wherein $P^1$ and $P^2$ comprise groups which undergo a photocyclisation and have the general formulae IV and V respectively

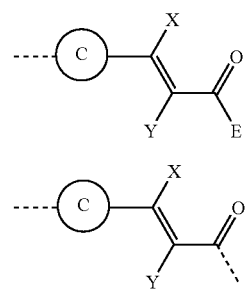

wherein the broken line in formula IV indicates the linkage to B, and the broken lines in formula V indicate the appropriate linkage to B or $S^1$ according to formula III;

C represents phenylene, which is unsubstituted or substituted by fluorine, chlorine or cyano, or by a cyclic, straight-chain or branched alkyl residue, wherein the cyclic, straight-chain or branched alkyl residue is unsubstituted, mono-substituted by cyano or halogen, or poly-substituted by halogen, wherein the straight-chain or branched alkyl residue has 1 to 18 carbon atoms and, when present, the cyclic residue has 3 to 18 ring atoms, and wherein one or more non adjacent $CH_2$ groups in the cyclic, straight-chain or branched alkyl residue may independently be replaced by Q, or C represents pyrimidine-2,5-diyl, pyridine-2,5-diyl, 2,5-thiophenylene, 2,5-furanylene, or 1,4- or 2,6-naphthylene;

E represents —$OR^4$ or —$NR^5R^6$, wherein $R^4$, $R^5$ and $R^6$ are, independently of each other, a hydrogen atom or a cyclic, straight-chain or branched alkyl residue, wherein the cyclic, straight-chain or branched alkyl residue is unsubstituted, mono-substituted by halogen, or poly-substituted by halogen, wherein the straight-chain or branched alkyl residue has 1 to 18 carbon atoms and, when present, the cyclic residue has 3 to 18 ring atoms, wherein one or more $CH_2$ groups in the cyclic, straight-chain or branched alkyl residue may independently be replaced by —O—, —CO—, —CO—O—, —O—CO—, or —CH═CH—, with the proviso that oxygen atoms are not directly attached to each other, or $R^5$ and $R^6$ are linked together to form an alicyclic ring with 5 to 8 atoms; and X, Y each, independently of the other, represents hydrogen, fluorine, chlorine, cyano, or alkyl optionally substituted by fluorine having from 1 to 12 carbon atoms in which optionally one or more non-adjacent $CH_2$ groups are independently replaced by —O—, —CO—O—, —O—CO— or —CH═CH—.

2. A photoactive copolymer according to claim 1, wherein $A^2$ is an unsubstituted five membered or six membered ring or an optionally substituted group of 2 to 5 condensed rings, in which one or two non adjacent $CH_2$ groups are optionally replaced by oxygen.

3. A photoactive copolymer according to claim 1, wherein $A^2$ is trans-decalin-2,6-diyl, trans,trans-perhydrophenanthren-2,7-diyl or a group incorporating a condensed ring system selected from a radical of a naturally occurring, at least bicyclic, diterpene or triterpene or from a steroid.

4. A photoactive copolymer according to claim 1, wherein $A^1$ and $A^3$, independently of each other, are unsubstituted saturated five or six membered alicyclic rings or six membered aromatic rings optionally substituted by fluorine, chlorine, or a straight chain or branched alkyl residue
  wherein the straight chain or branched alkyl residue is unsubstituted, mono- or poly-substituted by fluorine
  wherein the straight chain or branched alkyl residue has 1-12 carbon atoms,
  wherein one or more non adjacent $CH_2$ groups in the straight chain or branched alkyl residue may independently be replaced by —O—, —CO—O—, —O—CO—, —NR$^2$—CO—, —CO—NR$^2$—, —NR$^2$—CO—O—, —O—CO—NR$^2$—, —CH=CH—, —C≡C—, or —O—CO—O—,
  with the proviso that —CH=CH—, —C≡C— are not in conjugation with an aromatic ring, and
  wherein $R^2$ represents a hydrogen atom or lower alkyl.

5. A photoactive copolymer according to any one of claim 1, wherein the rings $A^1$ and $A^3$ are unsubstituted cyclopentane-1,3-diyl, cyclohexane-1,4-diyl or 1,4-phenylene which is unsubstituted, mono- or poly-substituted by fluorine, chlorine, or by a straight-chain or branched alkyl residue,
  wherein the straight-chain or branched alkyl residue unsubstituted, mono- or poly-substituted by fluorine,
  wherein the straight-chain or branched alkyl residue has 1-12 carbon atoms,
  wherein one or more non adjacent $CH_2$ groups in the straight-chain or branched alkyl residue may independently be replaced by —O—, —CO—O—, —O—CO—, —CH=CH—, or —C≡C—,
  with the proviso that —CH=CH— and —C≡C— are not in conjugation with aromatic rings.

6. A photoactive copolymer according to claim 1, wherein $S^1$ is a single bond, —CH$_2$—, a straight-chain or branched alkylene grouping represented by —(CH$_2$)$_r$—, or —(CH$_2$)$_r$—O—, —(CH$_2$)$_r$—CO—, —(CH$_2$)$_r$—CO—O—, —(CH$_2$)$_r$—O—CO—, —(CH$_2$)$_r$—CO—NR$^2$—, —(CH$_2$)$_r$—NR$^2$—CO—, —(CH$_2$)$_r$—NR$^2$—, —(CH$_2$)$_r$—O—(CH$_2$)$_s$—, —(CH$_2$)$_r$—CO—O—(CH$_2$)$_s$—, —(CH$_2$)$_r$—O—CO—(CH$_2$)$_s$—, —(CH$_2$)$_r$—NR$^2$CO—(CH$_2$)$_s$—, —(CH$_2$)$_r$—NR$^2$—CO—O—(CH$_2$)$_s$—, —(CH$_2$)$_r$—O—(CH$_2$)$_s$—O—, —(CH$_2$)$_r$—CO—O—(CH$_2$)$_s$—O—, —(CH$_2$)$_r$—O—CO—(CH$_2$)$_s$—O—, —(CH$_2$)$_r$—NR$^2$—CO—(CH$_2$)$_s$—O—, —(CH$_2$)$_r$—NR$^2$—CO—O—(CH$_2$)$_s$—O—, and if attached to a polystyrene, polyimide, polyamic acid or polyamic acid ester backbone, $S^1$ is also alternatively —O—(CH$_2$)$_r$—, —CO—O—(CH$_2$)$_r$—, —O—CO—(CH$_2$)$_r$—, —NR$^2$—CO—(CH$_2$)$_r$—, —CO—NR$^2$—(CH$_2$)$_r$—, —NR$^2$—(CH$_2$)$_r$—, —O—(CH$_2$)$_r$—CO—O—, —O—(CH$_2$)$_r$—O—CO—, —O—(CH$_2$)$_r$—CO—NR$^2$—, —O—(CH$_2$)$_r$—NR$^2$—, —O—(CH$_2$)$_r$—O—, —O—(CH$_2$)$_r$—NR$^2$—CO—, —NR$^2$—(CH$_2$)$_r$—CO—O—, —NR$^2$—(CH$_2$)$_r$—O—, —NR$^2$—(CH$_2$)$_r$—NR$^2$—, —NR$^2$—(CH$_2$)$_r$O—CO—, —CO—NR$^2$—(CH$_2$)$_r$—O—, —CO—NR$^2$—(CH$_2$)$_r$—NR$^2$—, —CO—NR$^2$—(CH$_2$)$_r$—O—CO—, —O—CO—(CH$_2$)$_r$—CO—, —O—CO—(CH$_2$)$_r$—O—, —O—CO—(CH$_2$)$_r$—NR$^2$—, —O—CO—(CH$_2$)$_r$—CO—O—, —O—CO—(CH$_2$)$_r$—CO—NR$^2$—, —O—CO—(CH$_2$)$_r$—NR$^2$—CO—, —O—(CH$_2$)$_r$—O—(CH$_2$)$_s$—, —O—(CH$_2$)$_r$—CO—O—(CH$_2$)$_s$—, —CO—O—(CH$_2$)$_s$—, —O—(CH$_2$)$_r$—NR$^2$—CO—(CH$_2$)$_s$—, —O—(CH$_2$)$_r$—NR$^2$—CO—O—(CH$_2$)$_s$—, —O—(CH$_2$)$_r$—CO—O—(CH$_2$)$_s$—O—, —O—(CH$_2$)$_r$—O—(CH$_2$)$_s$—O—, —O—(CH$_2$)$_r$—NR$^2$—CO—(CH$_2$)$_s$—O—, —CO—O—(CH$_2$)$_r$—O—(CH$_2$)$_s$—, wherein r and s are, independently of each other, an integer from 1 to 20,
with the proviso that r+s≦21, and
wherein $R^2$ represents hydrogen or lower alkyl.

7. A photoactive copolymer according to claim 1, wherein $S^1$ is a single bond, —CH$_2$—, a straight-chain alkylene grouping represented by —(CH$_2$)$_r$—, or —(CH$_2$)$_r$—O—, —(CH$_2$)$_r$—CO—O—, —(CH$_2$)$_r$—O—CO—, —(CH$_2$)$_r$—CO—NH—, —(CH$_2$)$_r$—NH—CO—, —(CH$_2$)$_r$—NH—CO—(CH$_2$)$_s$—, —(CH$_2$)$_r$—NH—CO—O—(CH$_2$)$_s$—, —(CH$_2$)$_r$—O—(CH$_2$)$_s$—O—, —(CH$_2$)$_r$—NH—CO—(CH$_2$)$_s$—O—, or —(CH$_2$)$_r$—NH—CO—O—(CH$_2$)$_s$—O—, and if attached to a polystyrene, polyimide, polyamic acid or polyamic acid ester backbone, $S^1$ is also alternatively —O—(CH$_2$)$_r$—, —CO—O—(CH$_2$)$_r$—, —CO—NH—(CH$_2$)$_r$—, —O—CO—(CH$_2$)$_r$—, —O—CO—(CH$_2$)$_r$—CO—O—, —O—(CH$_2$)$_r$—O—CO—, —O—(CH$_2$)$_r$—CO—NH—, —O—(CH$_2$)$_r$—NH—CO—, —CO—O—(CH$_2$)$_r$—O—, —CO—NH—(CH$_2$)$_r$—O—, —O—(CH$_2$)$_r$—O—, —O—(CH$_2$)$_r$—NH—CO—(CH$_2$)$_s$—, —O—(CH$_2$)$_r$—O—(CH$_2$)$_s$—O—, —O—CO—(CH$_2$)$_r$—O—(CH$_2$)$_s$—O—, —CO—O—(CH$_2$)$_r$—O—(CH$_2$)$_s$—O—, —O—(CH$_2$)$_r$—NH—CO—(CH$_2$)$_s$—O—, —O—CO—(CH$_2$)$_r$—NH—CO—(CH$_2$)$_s$—O—, wherein r and s are, independently of each other, an integer from 2 to 12 and the sum of r+s≦15.

8. A photoactive copolymer according to claim 1, wherein $S^1$ is a single bond, —CH$_2$—, a straight-chain alkylene grouping represented by —(CH$_2$)$_r$—, or —(CH$_2$)$_r$—O—, —(CH$_2$)$_r$—CO—O—, —(CH$_2$)$_r$—O—CO—, —(CH$_2$)$_r$—O—(CH$_2$)$_s$—O—, or —(CH$_2$)$_r$—NH—CO—O—(CH$_2$)$_s$—O—, and if attached to a polystyrene, polyimide, polyamic acid or polyamic acid ester backbone, $S^1$ is also alternatively —O—(CH$_2$)$_r$—, —CO—O—(CH$_2$)$_r$—, —O—CO—(CH$_2$)$_r$—, —O—CO—(CH$_2$)$_r$—CO—O—, —O—(CH$_2$)$_r$—O—CO—, —CO—O—(CH$_2$)$_r$—O—(CH$_2$)$_s$O—, —O—(CH$_2$)$_r$—O—(CH$_2$)$_s$—O—, —O—CO—(CH$_2$)$_r$—O—(CH$_2$)$_s$O—(CH$_2$)$_s$—O—, —CO—O—(CH$_2$)$_r$—O—(CH$_2$)$_s$—O—, wherein r and s are, independently of each other, an integer from 2 to 8 and the sum of r+s≦10.

9. A photoactive copolymer according to claim 1, wherein at least one of $Z^1$ and $Z^2$ is a single covalent bond or a straight-chain or branched alkylene residue
  wherein the straight-chain or branched alkylene residue is unsubstituted, mono-substituted or poly-substituted by fluoro,
  wherein the straight-chain or branched alkylene residue has 1 to 8 carbon atoms,
  wherein one or more non adjacent $CH_2$ groups in the straight-chain or branched alkylene residue may independently be replaced by —O—, —CO—, —CO—O—, —O—CO—, —NR$^2$—CO—, —CO—NR$^2$—, —NR$^2$—CO—O—, —O—CO—NR$^2$—, —CH=CH—, —C≡C—, or —O—CO—O—, with the proviso that —CH=CH— and —C≡C— are not in conjugation with aromatic rings, and wherein $R^2$ represents a hydrogen atom or lower alkyl.

10. A photoactive copolymer according to claim 1, wherein at least one of $Z^1$ and $Z^2$ is a single covalent bond or a straight-chain or branched alkylene residue,
  wherein the straight-chain or branched alkylene residue has 1 to 6 carbon atoms,
  wherein one or more non adjacent $CH_2$ groups in the straight-chain or branched alkylene residue may independently be replaced by —O—, —CO—O—, —O—CO—, —CH=CH—, —C≡C—, or —O—CO—O—, with the proviso that —CH═CH— and —C≡C— are not in conjugation with aromatic rings.

11. A photoactive copolymer according to claim 1, wherein at least one of $Z^1$ and $Z^2$ is a single covalent bond or a straight-chain or branched alkylene residue,
wherein the straight-chain or branched alkylene residue has 1 to 4 carbon atoms, and
wherein one or two non adjacent $CH_2$ groups in the straight-chain or branched alkylene residue may independently be replaced by —O—, —CO—, —O—CO—.

12. A photoactive copolymer according to claim 1, wherein $R^1$ is a hydrogen atom, a fluoro atom, a chlorine atom, a cyano group, or a straight-chain or branched alkyl residue,
wherein the straight-chain or branched alkyl residue is unsubstituted, mono-substituted by cyano or halogeno, or poly-substituted by fluoro,
wherein the straight-chain or branched alkyl residue has 1 to 18 carbon atoms,
wherein one or more non adjacent $CH_2$ groups in the straight-chain or branched alkyl residue may independently be replaced by —O—, —CO—, —CO—O—, —O—CO—, —NR²—CO—, —CO—NR²—, —NR²—CO—O—, —O—CO—NR²—, —CH═CH—, —C≡C—, or —O—CO—O—,
with the proviso that —CH═CH— and —C≡C— are not attached directly to an aromatic ring, and
wherein $R^2$ represents a hydrogen atom or lower alkyl.

13. A photoactive copolymer according to claim 1, wherein $R^1$ is a hydrogen atom, a fluoro atom, a chloro atom, a cyano group, or a straight-chain or branched alkyl residue,
wherein the straight-chain or branched alkyl residue is unsubstituted,
wherein the straight-chain or branched alkyl residue has 1 to 12 carbon atoms,
wherein one or more non adjacent $CH_2$ groups in the straight-chain or branched alkyl residue may independently be replaced by —O—, —CO—, —CO—O—, —O—CO—, —CH═CH—, —C≡C—, or —O—CO—O—,
with the proviso that —CH═CH— and —C≡C— are not attached directly to an aromatic ring.

14. A photoactive copolymer according to claim 1, wherein n and m are each chosen such that the total number of rings in the substructure of formula I are 2-5 including the number of rings in a condensed system.

15. A photoactive copolymer according to claim 1, wherein m and n are chosen such that the total number of rings including the rings in the optional condensed system are 3 or 4.

16. A photoactive copolymer according to claim 1, wherein q is 1 except where ring $A^1$ is chosen from a radical of a di- or triterpene or a steroid.

17. A photoactive copolymer according to claim 16, wherein $A^1$ is a radical of a steroid and q has the value of 0.

18. A photoactive copolymer according to claim 1, wherein:
C represents phenylene, which is unsubstituted or substituted by a straight-chain or branched alkyl residue,
wherein the straight-chain or branched alkyl residue is unsubstituted or mono- or polysubstituted by fluorine,
wherein the straight-chain or branched alkyl residue has 1 to 18 carbon atoms, and
wherein one or more non adjacent $CH_2$ groups in the straight-chain or branched alkyl residue may independently be replaced by —O—, —CO—, —CO—O—, —O—CO, or
—CH═CH—,
or C represents 2,5-furanylene, 1,4- or 2,6-naphthylene;

E represents —$OR^4$ wherein $R^4$ is a cyclic, straight-chain or branched alkyl residue
wherein the cyclic, straight-chain or branched alkyl residue is unsubstituted or mono- or polysubstituted by fluorine,
wherein the straight-chain or branched alkyl residue has 1 to 18 carbon atoms and,
when present, the cyclic residue has 3 to 18 carbon atoms,
wherein one or more non adjacent $CH_2$ groups in the cyclic, straight-chain or branched alkyl residue may independently be replaced by —O—; and
X, Y are hydrogen atoms.

19. A photoactive copolymer according to claim 1, wherein the polymer backbones to which the side chains of formula I and the photoreactive side chains are attached, are those which are generally used for photoaligning polymers.

20. A photoactive copolymer according to claim 19, wherein the backbone is formed from acrylate, methacrylate, 2-chloroacrylate, 2-phenylacrylate, optionally N-lower alkyl substituted acrylamide, methacrylamide, 2-chloroacrylamide, 2-phenylacrylamide, vinyl ether, vinyl ester, styrene derivatives, siloxanes, imides, amic acids and their esters, amidimides, maleic acid derivatives, fumaric acid derivatives.

21. A photoactive copolymer according to claim 19, wherein the backbone is formed from acrylate, methacrylate, optionally N-lower-alkyl-substituted acrylamide, methacrylamide, vinyl ether, vinyl ester, styrene derivatives, imides, or amic acids and their esters and amidimides.

22. A photoactive copolymer according to claim 19, wherein the backbone is formed from acrylate, methacrylate, optionally N-lower-alkyl-substituted acrylamide, methacrylamide, vinyl ether, vinyl ester, or styrene derivatives.

23. A photoactive copolymer according to claim 19, wherein the backbone is formed from polyacrylate, polymethacrylate, polyvinyl ether and polyvinyl ester.

24. A photoactive copolymer according to claim 1, wherein the proportion of the side groups of formula I relative to the photoreactive side groups is <50%.

25. A polymer mixture comprising at least two components, in which at least one component is a photoactive copolymer according to claim 1 and at least one other component is another photoreactive polymer or copolymer.

26. A mixture according to claim 25, wherein the another photoreactive polymer or copolymer is based on acrylate, methacrylate, optionally N-lower-alkyl-substituted acrylamide, methacrylamide, vinyl ether, vinyl ester, styrene derivatives, imides, amic acids and their esters or amidimides, and wherein the side chains contain as photoreactive groups substructures of formulae II or III.

27. A mixture according to claim 25, wherein said another photoreactive polymer or copolymer is based on imides, amic acids or amic acid esters incorporating cinnamic acid or coumarin derivatives as photoreactive side chains.

28. A mixture according to claim 25, wherein the photoactive copolymer according to claim 1 is based on polyacrylate, polymethacrylate, polyvinyl ether or polyvinyl ester and the other photoreactive polymer or copolymer is based on polyimide, polyamic acid or polyamic acid ester.

29. A mixture according to claim 25, wherein the content of the photoactive copolymer incorporating the side chains of the general formula (I) is <25 wt %.

30. A polymer layer comprising one or more copolymers as claimed in claim 1.

31. An orientation layer for liquid crystals comprising one or more copolymers as claimed in claims 1.

32. An optical or electro-optical device comprising one or more copolymers as claimed in claim 1.

33. An optical constructional element comprising one or more copolymers as claimed in claim 1.

34. A photoactive copolymer according to claim 1, wherein $A^2$ is a group incorporating a condensed ring system selected from a radical of a naturally occurring, at least bicyclic, diterpene or triterpene and from a steroid, and wherein the steroid is cholesterol or cholestanol.

35. A photoactive copolymer according to claim 6, wherein r and s are, independently of each other, an integer from 2 to 12; with the proviso that $r+s \leq 21$.

36. A photoactive copolymer according to claim 35, wherein the sum of $r+s \leq 15$.

37. A photoactive copolymer according to claim 24, wherein the proportion of the side groups of formula I relative to the photoreactive side groups is <25%.

38. A photoactive copolymer according to claim 37, wherein the proportion of the side groups of formula I relative to the photoreactive side groups is <20%.

39. A mixture according to claim 25, wherein the content of the photoactive copolymer is <15 wt %.

40. A mixture according to claim 25, wherein the content of the photoactive copolymer is <10 wt %.

41. A method for orienting liquid crystal molecules, comprising orienting the molecules with an orientation layer as claimed in claim 31.

42. An unstructured or structured optical element, comprising one or more copolymers as claimed claim 1.

43. A multi-layer system, comprising one or more copolymers as claimed claim 1.

44. A photoactive copolymer according to claim 1, wherein the spacer unit in S1 represents a straight-chain or branched alkylene residue,
   wherein the straight-chain or branched alkylene residue is unsubstituted, mono-substituted by cyano or halogen, or poly-substituted by halogen,
   wherein the straight-chain or branched alkylene residue has 1 to 24 carbon atoms, and
   wherein one or more non adjacent $CH_2$ groups in the straight-chain or branched alkylene residue may independently be replaced by Q.

45. A photoactive copolymer according to claim 1, wherein the spacer unit in $Z^1$ or $Z^2$ represents a straight-chain or branched alkylene residue,
   wherein the straight-chain or branched alkylene residue is unsubstituted, mono-substituted by cyano or halogen, or poly-substituted by halogen,
   wherein the straight-chain or branched alkylene residue has 1 to 8 carbon atoms, and
   wherein one or more non adjacent $CH_2$ groups in the straight-chain or branched alkylene residue may independently be replaced by Q.

46. A polymer layer comprising a mixture as claimed in claim 25 in at least partially cross-linked form.

47. An orientation layer for liquid crystals comprising a mixture as claimed in claim 25 in at least partially cross-linked form.

48. An optical or electro-optical device comprising a mixture as claimed in claim 25 in at least partially cross-linked form.

49. An optical constructional element comprising a mixture as claimed in claim 25 in at least partially cross-linked form.

50. An unstructured or structured optical element comprising a mixture as claimed in claim 25 in at least partially cross-linked form.

51. A multi-layer system comprising a mixture as claimed in claim 25 in at least partially cross-linked form.

* * * * *